April 2, 1940.     G. KONICEK     2,195,572
SEPARABLE SUPERPOSED CARRIER
Original Filed April 4, 1938     2 Sheets-Sheet 1
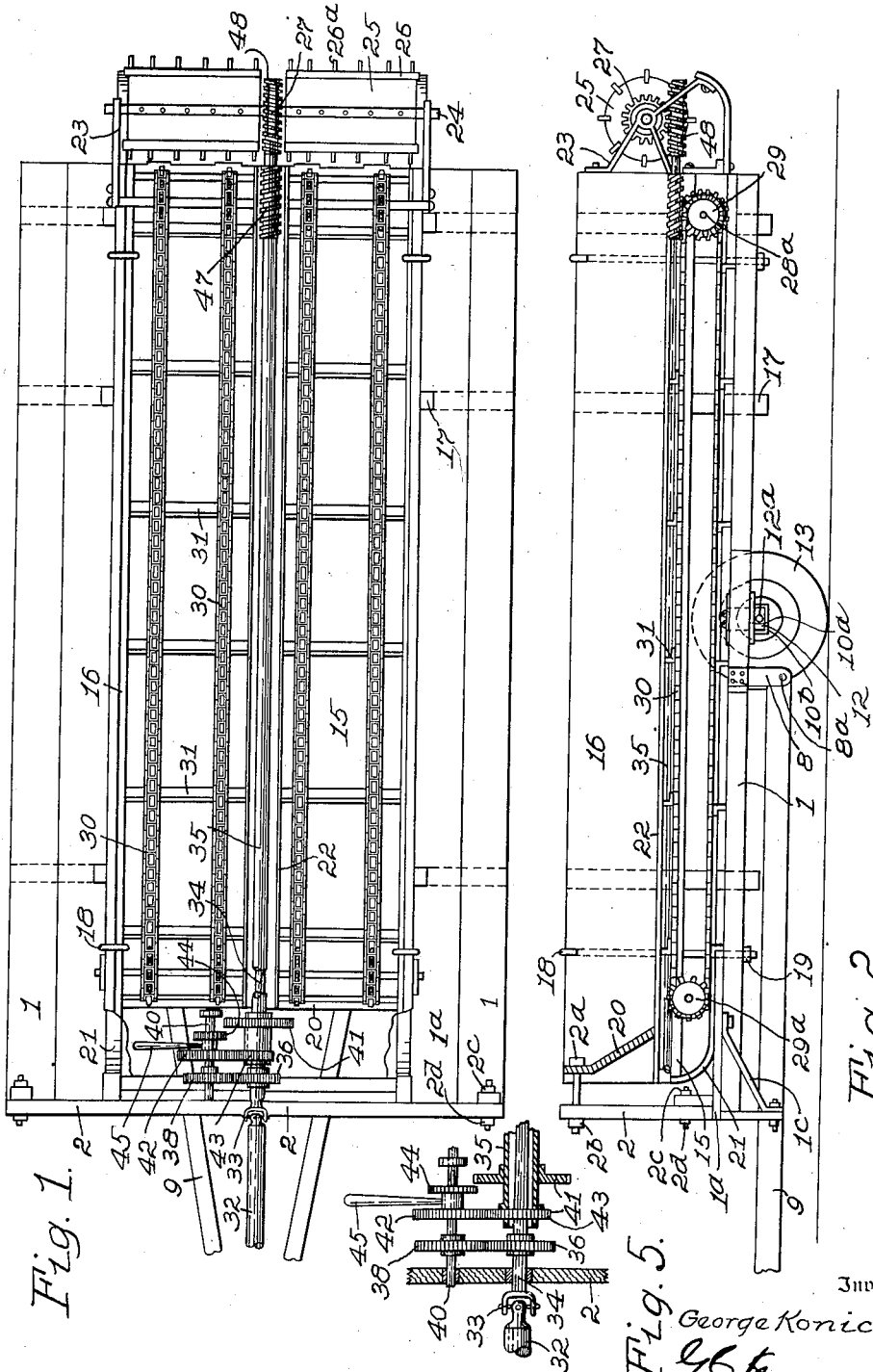
Inventor
George Konicek, by
G. C. Kennedy
Attorney April 2, 1940.　　　　G. KONICEK　　　　2,195,572
SEPARABLE SUPERPOSED CARRIER
Original Filed April 4, 1938　　2 Sheets-Sheet 2
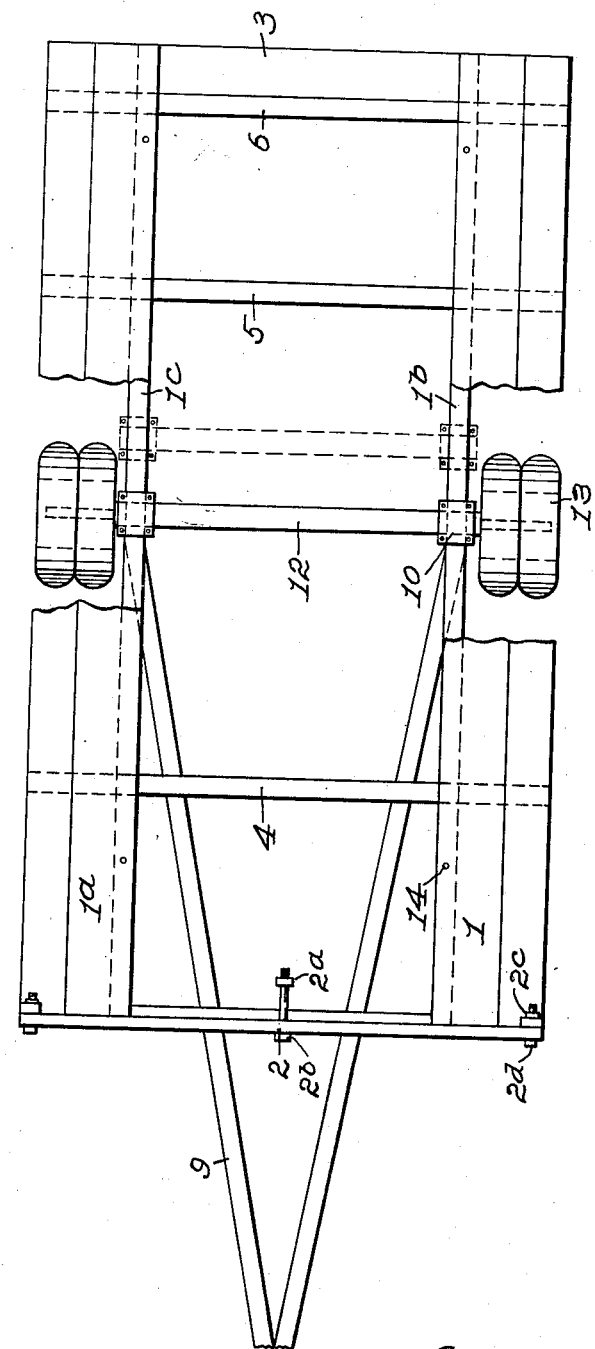
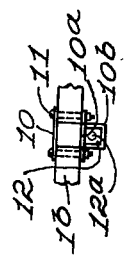
Inventor
George Konicek, by
G. C. Kennedy
Attorney.

Patented Apr. 2, 1940

2,195,572

UNITED STATES PATENT OFFICE 2,195,572

SEPARABLE SUPERPOSED CARRIER

George Konicek, Bruce Township, Benton County, Iowa

Original application April 4, 1938, Serial No. 199,759. Divided and this application December 31, 1938, Serial No. 248,739

1 Claim. (Cl. 214—85)

My invention relates to improvements in separable superposed carriers, and the principal object of my invention is to releasably support on a tiltable transfer cart a load carrier device slidably mounted thereon on skid or runner means and also having releasably lockable means for anchoring a loading therein.

This application is a division of my application for patent for Combination transporters and demountable distributers, Serial No. 199,759, filed April 4, 1938.

The subject of this invention therefore pertains particularly to tiltable carts, and the combination therewith of a carrier having runners slidably supported on a cart, and releasably connected thereto, and also releasably connected to a load in the carrier, all being arranged in a separably locked condition for transportation and loading or unloading conveniently.

My invention is illustrated in the accompanying drawings, in which Fig. 1 is a top plan of a transfer cart, tiltably mounted and having a carrier slidably mounted thereon and releasably secured thereto, and a loading positioned on the carrier and releasably connected thereto in superposition, parts of each being broken away. Fig. 2 is a side elevation of said elements as assembled in interlocked superposed positions, in partial section and with parts removed or broken away, with certain parts shown in dotted lines. Fig. 3 is a top plan of the transfer cart alone, with portions broken away. Fig. 4 is a detail side elevation of a side beam of the cart, and of an axle mounted thereon. Fig. 5 is an enlarged top plan of the change speed mechanism of a fertilizer distributer shown in said Figs. 1 and 2 in operative relations therewith as a loading for the carrier.

The transfer cart shown in top plans of Figs. 1 and 3, and in side elevation in Fig. 2 is simple in construction. It consists of an open platform having spaced transverse beams 4, 5 and 6, connected to transversely spaced pairs of floor boards at 1 and 1a rigidly, with a rear cross board 3, and a forward upwardly extending wall 2. An axle 12 of squared cross section is secured across spaced longitudinal beams 1b and 1c medially, but may be adjusted longitudinally rearwardly along the beams as shown in dotted lines in Fig. 3, and in side view in said Fig. 4.

As shown in Fig. 4, the beams 1b and 1c have pairs of plates 10 and 10a on their upper and lower faces and are apertured to receive bolts 11 with nuts to secure them in place, but when the nuts are loosened, the plates may be adjustably shifted along the beams as desired, as indicated by the dotted lines in Fig. 3. The beam 12 has end pintles 12a in bearings in depending loops 10b on the lower plates 10a, and the wheels 13 are mounted rotatably on the pintle ends without the bearings.

In Fig. 2 the side beams 1 have fixed depending hangers 8, to which are pivoted the rear ends of forwardly convergent draft beams 9. A wall 2 is fixed across the forward parts of the boards 1 and 1a, and anchored by bolts and nuts 2c and 2d to short uprights in the rear. The depending angular braces 1c strengthen the forward connected parts of said wall and floor boards.

Metallic runners 21 have upturned end parts, and depend longitudinally from the bottom of the wagon box floor boards 15, the wagon box being composed of an inclined front wall 20 and side walls 16, the rear end of the box being open. The forward upcurved ends of the runners are fastened to the forward ends of the floor boards 15, while the like upcurved rear ends of the runners are rigidly connected to the rear ends of the side walls 16 by rearwardly inclined struts 23 which include apertured bearings to receive the ends of a rotatable shaft 24 carrying a pair of alined spaced beater drums 25. This wagon box, when the transfer cart is tilted back on the pintles 12a, may on its runners 21 be pushed slidingly up the incline of the floor of the cart, or it may be removed therefrom similarly rearwardly. When the box is installed upon the cart as shown in Fig. 2, it may be releasably secured thereto by a bolt or bolts 2a and nut or nuts 2b traversing the front wall 20 of the box and also the cross wall 2 of the cart. It is obvious that any other suitable carrier device than said wagon box may be supplied with like runners or the equivalent and mounted on and connected releasably to the cart in like manner.

It is also obvious, that as the cart is a carrier for the wagon box or other carrier device superposed thereupon, the latter carrier may support any kind of loading thereupon, while being also movable on its runners slidingly on or off of the cart when tilted rearwardly. The parent application hereinbefore referred to Serial No. 199,759, filed April 4, 1938, displays as the loading for the wagon box a fertilizer distributer mounted therein, and the same is shown in this divisional application.

The fertilizer distributer shown in both applications is the same, including the same reference numerals for its parts, but not specifically claimed herein. However, said distributer includes mechanisms for transporting a loading of fertilizer through the wagon box shown rearwardly, and a cooperating pair of fingered beater drums supported at the rear end of the box. The wagon box therefore is a carrier for said mechanisms and for a loading of fertilizer deposited therein, but instead of a wagon box as stated any other type of carrier may be used for other purposes or loadings and supplied with skids or depending longitudinal runners for seating the upper carrier in superposition upon the lower cart or carrier and releasable connection thereto when seated, without departing from this invention and the scope of the appended claim. Furthermore, the skid carrying carrier device may be removed from the cart, and a different carrier with skids substituted, according to the kinds of loadings to be transported upon the cart, or when the upper carrier is removed, the cart may be employed separately for transportation purposes as desired.

I claim:

In combination, a platform having an upwardly directed structure fixed on its forward end, carrying wheels mounted on said platform and adjustable longitudinally, a draft connection pivoted at its rear end to the platform medially, an open top box having forward and side walls and having transversely spaced longitudinal skids fixedly mounted on and depending therefrom, with its skids adapted to slide lengthwise on the floor of the platform in either position of translation thereon forward or back when the platform is tilted rearwardly, and separable connecting means between the forward wall of the box and said forward structure on the platform.

GEORGE KONICEK.